April 19, 1938. F. A. SELJÉ 2,114,359
VEHICLE BODY APPURTENANCE
Filed Jan. 2, 1937 2 Sheets-Sheet 1
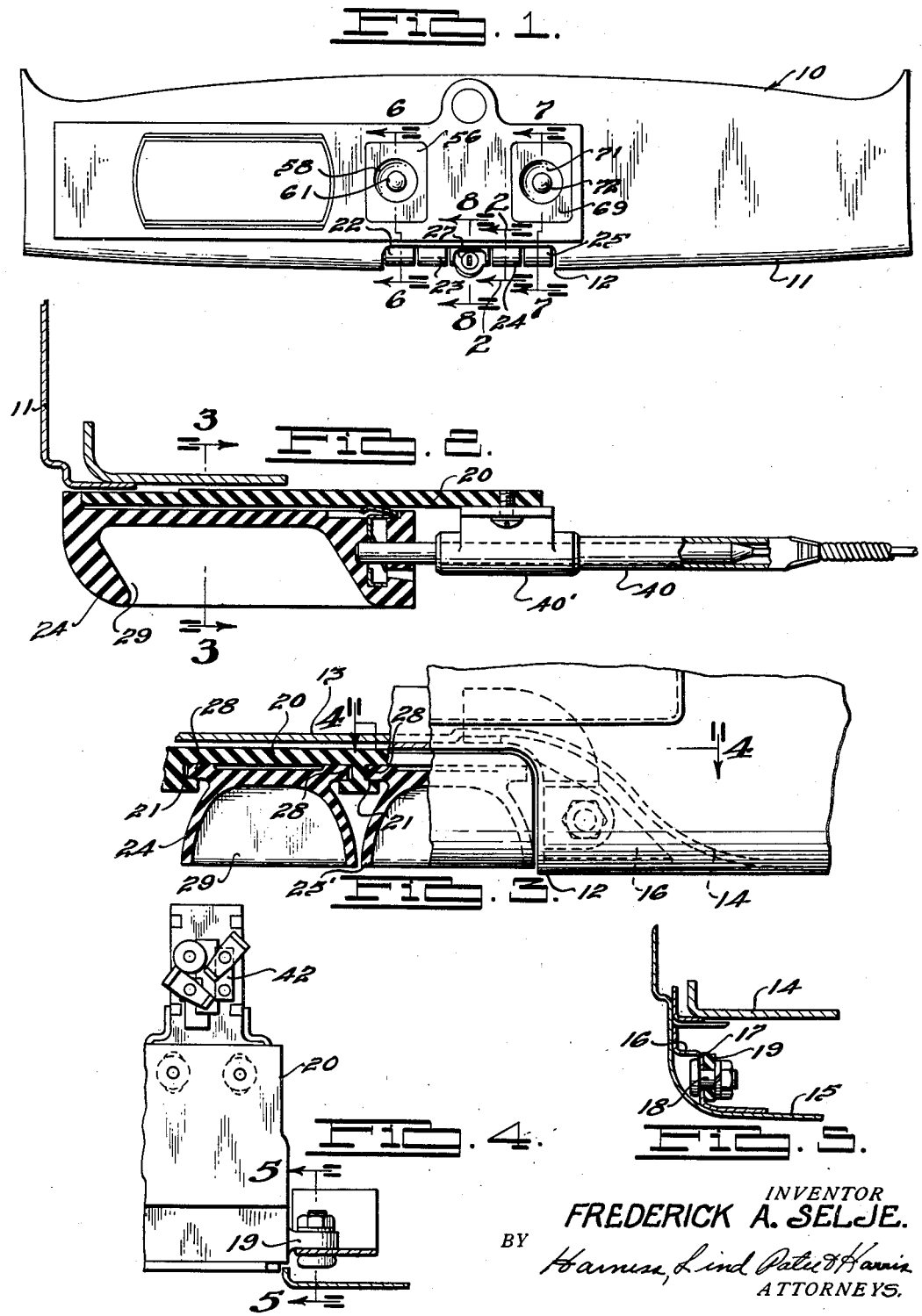
INVENTOR
FREDERICK A. SELJE.
BY Harness, Lind Pate & Harris
ATTORNEYS.

April 19, 1938.  F. A. SELJÉ  2,114,359
VEHICLE BODY APPURTENANCE
Filed Jan. 2, 1937  2 Sheets-Sheet 2
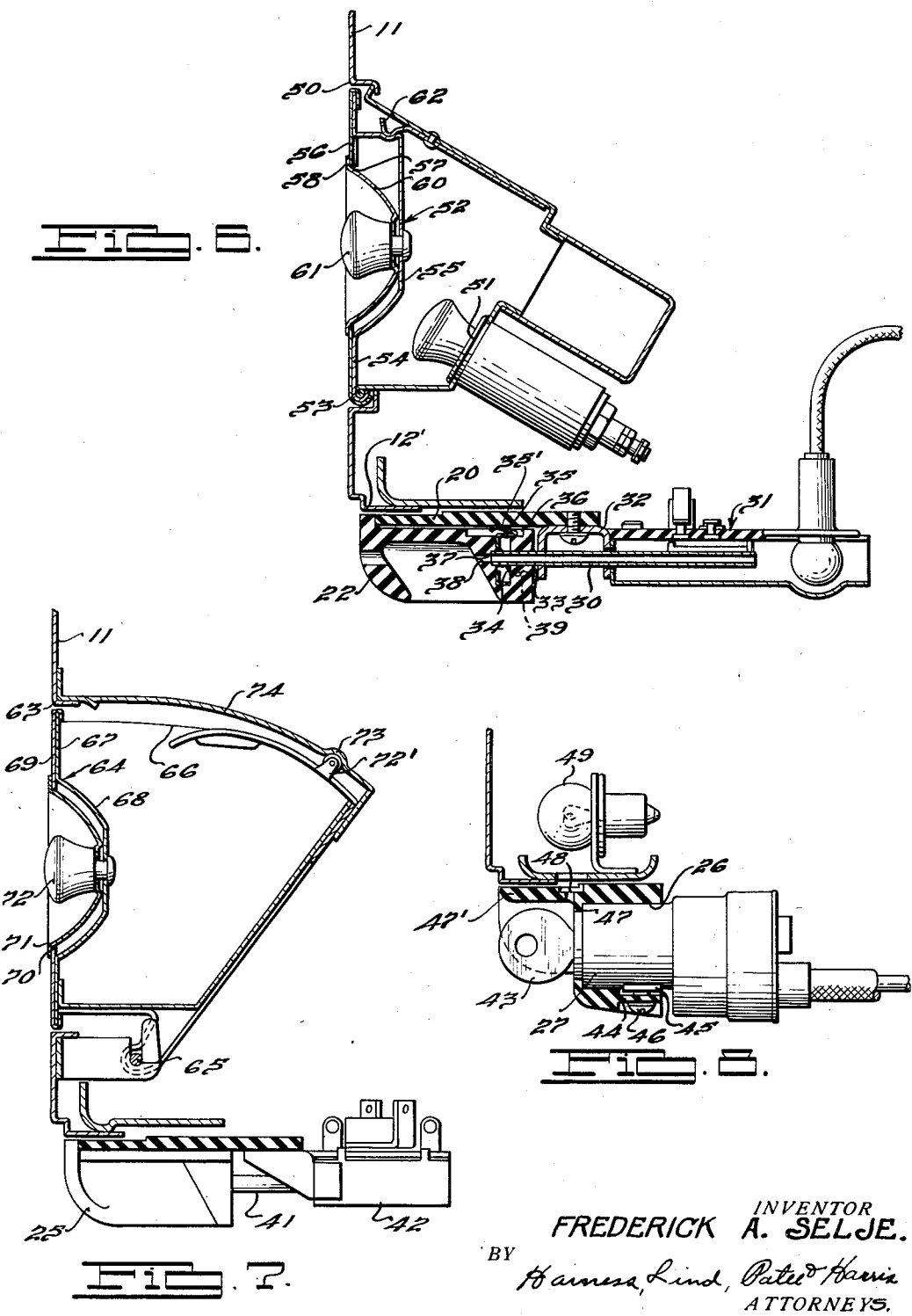
INVENTOR
FREDERICK A. SELJE.
BY Harness, Lind, Pate & Harris
ATTORNEYS.

Patented Apr. 19, 1938

2,114,359

UNITED STATES PATENT OFFICE 2,114,359

VEHICLE BODY APPURTENANCE

Frederick A. Seljé, Grosse Pointe, Mich., assignor to Chrysler Corporation, Highland Park, Mich., a corporation of Delaware Application January 2, 1937, Serial No. 118,751

10 Claims. (Cl. 180—90)

This invention relates to motor vehicles and more particularly to instrument panels therefor.

An object of the invention is to provide an instrument panel which will reduce the possibilities of injury to passengers resulting from forceful contact with portions of the vehicle body.

In the construction of vehicle bodies there is provided immediately in advance of the operator for his ready convenience, a panel upon which are mounted various instruments and also control members, including knobs and levers, for operating and regulating remotely positioned mechanisms. Heretofore, these control members have been generally so disposed in both their normal operative and inoperative positions as to project beyond the face of the instrument panel into the passenger compartment. The disposition of the panel and the control members thereon is such that abrupt and unexpected change in the movement of the vehicle, particularly sudden stopping thereof, has frequently resulted in the passenger or passengers being forceably thrown into contact with the panel and controls, the latter, because of their relatively small surface area, applying a relatively high unit pressure on localized areas of the passenger's body.

More specifically stated, one of the main objects of the invention is to overcome the aforesaid condition by the provision of an instrument panel which normally presents a substantially smooth, generally uninterrupted outer face and which is free from sharp or hard surfaces of relatively small contact area projecting into the vehicle passenger compartment.

Another object of the invention is the provision of an instrument panel having a plurality of control members movably mounted thereon which are normally disposed substantially entirely on the side of the panel opposite from the passenger compartment.

A still further object of the invention is the provision in an instrument panel of an improved control member movably mounted thereon and having its outer face substantially flush with the outer face of the adjacent surface of the panel.

Other objects of the invention are to provide an instrument panel having improved means for supporting a control member for movement relative thereto; to provide improved means for operatively attaching the control member to the part to be actuated; and to provide an improved support for the actuated part.

The above being among the objects of the present invention, the same consists in certain novel features of construction and combination of parts to be hereinafter described with reference to the accompanying drawings and claims, having the above and other objects in view.

An illustrative embodiment of the invention is shown in the accompanying drawings, in which:

Fig. 1 is a side elevational view of an instrument panel embodying the invention.

Fig. 2 is a fragmentary, vertical, sectional view taken on the line 2—2 of Fig. 1.

Fig. 3 is a fragmentary, vertical, sectional view taken on the line 3—3 of Fig. 2.

Fig. 4 is a longitudinal, sectional view taken on the line 4—4 of Fig. 3.

Fig. 5 is a vertical, sectional view taken on the line 5—5 of Fig. 4.

Figs. 6, 7 and 8 are fragmentary, vertical, sectional views taken on the lines 6—6, 7—7 and 8—8, respectively, of Fig. 1.

Referring to the drawings, there is shown an instrument panel, generally designated by the numeral 10, especially adapted for use in motor vehicles. The panel 10 comprises a metallic stamping 11 having the exposed face thereof suitably finished to conform to the color scheme of the body interior. Formed in the lower longitudinal edge of the stamping 11, substantially mid-way of the opposite ends thereof, is a recess 12 which is bridged by an arched portion 13 of a reinforcing member 14. The opposite end portions of the member 14 rest upon and are suitably secured, as by welding, to adjacent ends of rearwardly extending flange sections 15 provided at the lower longitudinal edge of the stamping and located on opposite sides of the recess 12. The arched portion 13 engages a rearwardly extending flange 12' located at the upper extremity of the recess 12.

A reinforcing and securing bracket 16 is secured to the rear face of the panel 11 and the flange sections 15 adjacent each respective end of the recess 12, one of the brackets 16 being illustrated in Figs. 3 and 5. The bracket 16 has an intermediate portion 17 spaced from the stamping 11 on which is mounted a bolt 18 which extends through an aperture in an ear 19 of a supporting member 20 for securing the latter to the stamping 11 adjacent the recess 12. Formed in the under surface of the support 20 are a plurality of slideways 21, extending transversely of the stamping 11, for slidably supporting drawer-like control members 22, 23, 24 and 25 which are adapted to operate or actuate various mechanisms, such as light switches and carburetor choke and throttle controls, spaced from the instrument panel. An opening 26 is provided in the support 20 intermediate the slideways accommodating the controls 23 and 24 for receiving the end portion of a key actuated lock mechanism 27 hereinafter more fully described.

The control members 22 to 25 are generally similar in construction and are preferably formed of bakelite or other suitable material although the invention is not to be limited to the particular formation of these members. Each control has oppositely extending flanges 28 disposed in the respective slideways 21 supporting the same for movement transversely of the stamping 11. These control members together with the lock mechanism 27 occupy the space provided by the recess 12 and the exposed ends of the control members, which conform generally to the contour of the lower edge portion of the panel, substantially complete the contour of the latter. When in their normal inoperative position, as illustrated in the drawings, the major portion of the outer surface of the control members is substantially flush with the outer surface of the adjacent portion of the panel and the body thereof is disposed substantially entirely rearwardly of the exposed face of the panel, as viewed in Fig. 1. The lower face of each control member is recessed at 29 to provide a purchase for facilitating manual operation.

The control member 22, as illustrated in Fig. 6, is operatively connected by a conduit 30, having suitable electrical contact elements thereon, with a switch mechanism generally indicated at 31 in a lighting circuit (not shown) for the vehicle headlamps. The conduit 30 extends through registering apertures in a U-shaped bracket 32 secured to the support 20. The inner end portion of the conduit 30 extends into an opening 33 in the control 22 and an opening in a rearwardly extended struckout portion 34 of a metallic attaching member 35 disposed in a slot 36 in the control 22. The member 35 is preferably formed of spring steel and the opening in the struckout portion 34 is somewhat larger than the diameter of the conduit 30 to permit rearward disposition of the portion 34 so that the latter securely engages the outer surface of the conduit when the latter is moved to the left, as viewed in Fig. 6, in response to similar movement of the control 22. The innermost end of the conduit 30 abuts a shoulder 37 at the junction of the opening 33 and a smaller opening 38 communicating therewith for moving the conduit to the left. Formed on the upper end portion of the attaching member 35 is a reversely bent head part 35' which frictionally engages the lower surface of the support 20 in order to resiliently hold the control member from vibratory movement relative to the support 20. The free end of the struckout portion 34 extends over an opening 39 in the control member 22 so that when it is desired to disconnect the control and conduit a suitable instrument may be inserted in the opening 39 and the struckout portion 34 moved to the left, out of engagement with the conduit 30.

The control member 24 is adapted to actuate a Bowden wire connection, generally designated by the numeral 40, having one end thereof operatively attached to a mechanism, such as a carburetor control, spaced from the instrument panel and the other end thereof operatively secured to the control 24 in the manner set forth in connection with the control 22 and the conduit 30. The connection 40 is slidably supported by a depending bracket 40' secured to the support 20.

As illustrated in Fig. 7, the control member 25 is adapted to actuate a rod 41 having one end portion thereof operatively attached to a switch mechanism in an electrical circuit (not shown) for illuminating the instrument panel, the switch mechanism being disposed within the box 42. The opposite end of the rod 41 is operatively secured to the control member 25 in the manner described and illustrated in connection with the attachment of the control member 22 to the conduit 30.

The control member 23 may be connected in the manner illustrated in Fig. 7 to switch mechanism of any other circuit of the vehicle or it may be connected as illustrated in Fig. 2 to any remotely controllable mechanism.

The lock mechanism 27 extending into the opening 26 in the support 20 comprises a switch, operated by the key 43 in the usual manner, for controlling the conventional ignition system of the vehicle power plant. A flange 44 extending rearwardly from the support 20 is engaged between flanges 45 of the mechanism and retained therein by a screw 46 for holding the mechanism against movement relative to the panel. Movement of the mechanism to the left, as viewed in Fig. 8, is further restrained by an annular flange 47 formed in the opening 26 and against which an extremity of the mechanism abuts. The opening 26 is of sufficient extent to accommodate the lock mechanism 27 and key 43 so that the latter does not project beyond the exposed face of the adjacent panel surface. The support 20 has a portion 47' thereof projecting over the key 43, this latter portion having an opening 48 for the passage of light rays from a lighting member 49, positioned immediately above the opening, for illuminating this particular portion of the panel.

Formed in the stamping 11 immediately above the recess 12 is an opening 50 in which is disposed an accessory, such as a lighter 51, having a suitable energizing connection with the electrical system (not shown) of the vehicle. A closure member 52 hinged at 53 is provided for the opening and includes a back plate 54 having an offset 55, a finished face plate 56 having an opening 57 registering with the offset 55, and an outer plate 58 having its outer edge portion overlapping and suitably secured to that portion of the plate 56 adjacent the opening 57 and having a central spherical portion 60 extending into the opening 57 and secured to the offset 55 of the plate 54 by an operating knob 61. The exposed face of the closure member 52, other than the spherical portion 60, is substantially flush with the adjacent outer face of the panel and the knob 61 is disposed substantially entirely rearwardly of the panel face. The closure member is releasably held in closed position by the engagement of the offset 55 with a resilient retainer 62.

A second opening 63 is formed in the stamping 11 immediately above the recess 12 and as illustrated in Fig. 7 accommodates a receptacle, generally designated by the numeral 64, swingably mounted at 65 for movement into and out of the opening 63, although it will be understood that if desired the container may be mounted for linear movement in any well known manner. The receptacle 64 includes a body portion 66 having suitably secured thereto a plate 67 provided with an offset 68, a finished face plate 69 having an opening 70 registering with the offset 68, and an outer plate 71 having its edge portion overlapping a portion of the plate 69 adjacent the opening 70 and secured to the offset 68 by an operating knob 72. The exposed face of the receptacle 64 is substantially flush with the outer surface of the adjacent panel portion and the knob 72 is disposed substantially entirely rearwardly of the panel face. The receptacle 64 is illustrated in its retracted position wherein it is releasably held by a roller 72' carried thereby and seated in an offset 73 in a lateral projection 74 secured to the rear face of the stamping 11.

It will be understood, of course, that the aforesaid openings 50 and 63 may be formed at any desired location in the stamping 11, and that the particular construction of the closure member 52 and receptacle 64 may be varied from that illustrated, the important feature of the latter parts being their contribution to an instrument panel having a substantially smooth generally uninterrupted outer face free from operating members projecting therefrom in the direction of the passenger compartment of a vehicle body.

An instrument panel constructed and arranged in the manner herein illustrated and described has a substantially smooth outer exposed face which, under normal conditions, is uninterrupted by projections that would extend into a passenger compartment of the vehicle when the panel is applied thereto. The closure member 52 and the receptacle 64 are generally in their closed position as illustrated in the drawings and it is only infrequently that they are moved to and permitted to remain in open or extended position for more than a relatively short period of time. The drawer-like control members 22 to 25 are illustrated in their retracted or inoperative position and while these members are movable to an extended or operative position to project beyond the face of the instrument panel, their location at the lower longitudinal edge of the panel is such as to minimize the possibilities of injuries to passengers through contact with the instrument panel. Furthermore the closure member 52, receptacle 64 and controls 22 to 25 are not irresistibly held in extended position but are relatively freely movable to a retracted position in response to a slight degree of force. If desired, the exposed face of the aforesaid parts may be provided with a finish corresponding to that of the finish of the panel.

I do not limit my invention, in the broader aspects thereof, to any particular combination and arrangement of parts such as shown and described for illustrative purposes since various modifications will be apparent from the teachings of my invention and scope thereof as defined in the appended claims.

What I claim is:

1. An instrument panel comprising a face portion, control members operatively mounted thereon and movable in a direction transversely thereof into extended and retracted position with respect to the plane of said face portion, said control members when in their normal retracted inoperative position being disposed substantially entirely on the side of the plane of said face portion in the direction of said retracted inoperative position.

2. An instrument panel having an exposed face portion, control members operatively mounted thereon and movable in a direction transversely thereof into extended and retracted positions, the outer surface of said control members being normally disposed substantially flush with the exposed face portion of said panel adjacent thereto when said members are in their retracted position.

3. In an instrument panel having a support, mechanism to be actuated associated with said panel, means for actuating said mechanism comprising a drawer-like control member slidably mounted on said support for movement in a direction transversely of said panel into extended and retracted positions, and means for detachably securing said control member to said mechanism, said control member when in its normal retracted position being disposed substantially entirely on the side of the plane of said panel in the direction of said retracted position.

4. In an instrument panel having an exposed face portion provided with a recess in an edge portion thereof, mechanism to be actuated associated with said panel and disposed adjacent said recess, and a control member for actuating said mechanism disposed in said recess and movable transversely of said panel into extended and retracted positions, said control member when in its retracted position being disposed substantially entirely on the side of the plane of said panel opposite from said exposed face portion.

5. In an instrument panel having a recess in an edge portion thereof, a lock mechanism associated with said panel adjacent said recess, and a key extending into said recess for actuating said lock mechanism, said key having a head portion projecting from said mechanism and disposed substantially entirely within the confine of said recess.

6. In an instrument panel including an exposed face portion having a recess in an edge portion thereof, lock mechanism associated with said panel, means for supporting said mechanism adjacent said recess, and a key for actuating said mechanism disposed in said recess, said key having a head portion projecting from said mechanism and disposed substantially entirely on the side of the plane of said panel opposite from said exposed face portion.

7. In an instrument panel having a recess in an edge portion thereof, mechanism to be actuated associated with said panel and disposed adjacent said recess, means for actuating said mechanism comprising a manually operable drawer-like control member mounted in said recess for movement transversely of said panel into extended and retracted positions, said control member when in its normal retracted position having the portion thereof adapted to be engaged for manual operation disposed substantially entirely on the side of the plane of said panel in the direction of said retracted position.

8. In an instrument panel having a recess in an edge portion thereof, mechanism to be actuated associated with said panel, and means for actuating said mechanism comprising a plurality of drawer-like control members slidably mounted in said recess and adapted to substantially fill the latter, said control members having extremities adapted to align with and render said edge portion of said panel substantially continuous when said control members are in retracted positions.

9. An instrument panel comprising a face portion having a recess in a longitudinal edge portion thereof, a flange projecting laterally of said face portion, a reinforcing member extending longitudinally of said face portion and bridging said recess, a support secured to said reinforcing member, and a plurality of control members mounted on said support for movement transversely of said face portion.

10. An instrument panel for an automobile having a transversely extending face portion, a plurality of control members operatively mounted thereon and movable with respect thereto to operative and inoperative positions for respectively controlling mechanisms associated with said automobile, said panel and said control members being so constructed and arranged that no portion of any one of said control members projects forwardly beyond the exposed face of said panel when said control member is in at least one of its said positions.

FREDERICK A. SELJÉ.